(12) United States Patent
Bou-Ghannam et al.

(10) Patent No.: US 8,019,814 B2
(45) Date of Patent: Sep. 13, 2011

(54) SERVICE FOR STANDARDIZATION OF RESOURCE METADATA MODELS VIA SOCIAL NETWORKING—ARRIVING AT AN AGREED UPON (STANDARD) RESOURCE META-MODEL VIA SOCIAL CONSENSUS

(75) Inventors: Akram Bou-Ghannam, Boca Raton, FL (US); Amit Aghara, Boca Raton, FL (US); Pradeep P. Mansey, Boca Raton, FL (US); John Williams Miller, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 12/623,617

(22) Filed: Nov. 23, 2009

(65) Prior Publication Data

US 2011/0125828 A1 May 26, 2011

(51) Int. Cl.
*G06F 15/16* (2006.01)
(52) U.S. Cl. ........ 709/203; 709/223; 709/227; 709/229; 709/246
(58) Field of Classification Search .................. 709/203, 709/217, 223, 224, 227, 229, 246; 707/104.1; 703/1
See application file for complete search history.

(56) References Cited

U.S. PATENT DOCUMENTS

| | | | | |
|---|---|---|---|---|
| 2002/0116485 | A1* | 8/2002 | Black et al. | 709/227 |
| 2002/0165961 | A1* | 11/2002 | Everdell et al. | 709/225 |
| 2003/0126195 | A1* | 7/2003 | Reynolds et al. | 709/203 |
| 2004/0054690 | A1* | 3/2004 | Hillerbrand et al. | 707/104.1 |
| 2004/0117346 | A1 | 6/2004 | Stoffel et al. | |

(Continued)

FOREIGN PATENT DOCUMENTS

WO WO2007065470 6/2007

(Continued)

OTHER PUBLICATIONS

Moran, T.P., Unified Activity Management: Explicitly Representing Activity in Work-Support Systems, Workshop on Activity: From a Theoretical to a Computational, p. 5, 2005.

(Continued)

*Primary Examiner* — Quang N. Nguyen
(74) *Attorney, Agent, or Firm* — Cahn & Samuels, LLP (57) ABSTRACT

Disclosed are systems and methods for generating standardized models for a resource via social computing. The disclosed systems and methods generate standardized models for resources via social computing and include receiving a request for the registration of a resource from a first client; collecting data defining at least one property of the resource to be registered and registering the resource with a server having a plurality of clients. The method also includes receiving subsequent request for the registration of a substantially similar resource from a second client; providing the subsequent client with earlier collected data from other clients defining the properties of the existing resource, and receiving data chosen by the subsequent client defining the properties of the new substantially similar resource. The method further includes weighting the collected data defining at least one property of the resource based on the frequency of selection of the data to define at least one of the property of the resource by clients of the server registering a substantially similar resource and designating a consensus, of the plurality of clients, of the defining properties of the substantially similar resources as the defining properties for a synthetic standard format model for the resource and substantially similar resources based on the weighted data.

13 Claims, 5 Drawing Sheets

U.S. PATENT DOCUMENTS

| | | |
|---|---|---|
| 2004/0186738 A1 | 9/2004 | Reisman |
| 2005/0256819 A1 | 11/2005 | Tibbs et al. |
| 2006/0004703 A1 | 1/2006 | Spivack et al. |
| 2006/0111880 A1* | 5/2006 | Brown et al. .................... 703/1 |
| 2007/0087756 A1 | 4/2007 | Hoffberg |
| 2007/0118394 A1 | 5/2007 | Cahoon et al. |
| 2009/0222921 A1* | 9/2009 | Mukhopadhyay et al. ... 709/224 |

FOREIGN PATENT DOCUMENTS

| | | |
|---|---|---|
| WO | WO2008001281 | 1/2008 |
| WO | WO2008076438 | 6/2008 |

OTHER PUBLICATIONS

Pundt, H., et al., Domain ontologies for data sharing—an example from environmental monitoring using field GIS, Computers & Geosciences, pp. 95-102, Feb. 2002.

Damjanovic, V., et al., Semiotics for Ontologies and Knowledge Representation, WSPI'05 Second International Workshop on Philosophy and Informatics, pp. 1-4, Apr. 11-13, 2005.

Guo, H., et al., SOaP: Social Filtering through Social Agents, ERCIM Workshop Proceedings—No. 98-W001, pp. 1-6, Feb. 10, 2002.

* cited by examiner

SERVICE FOR STANDARDIZATION OF RESOURCE METADATA MODELS VIA SOCIAL NETWORKING—ARRIVING AT AN AGREED UPON (STANDARD) RESOURCE META-MODEL VIA SOCIAL CONSENSUS

I. FIELD OF THE INVENTION

This invention relates in general to the field of computer systems and social computing and in particular to the field of creating a standard data model for a given resource via a consensus developed through a social computing network.

II. DESCRIPTION OF THE PRIOR ART

Published U.S. Patent Application No. 20050256819A1 discloses a system and method of defining system behavior. The invention is directed to selecting optimal actions by a process of reasoning about a systems self knowledge. One or more of the following parameters are considered in the process, the environmental state, system state, user situation, available system capabilities and network accessible functions and services and knowledge represented as ontologies.

Published U.S. Patent Application No. 20040117346A1 discloses a common platform computer-based method for repurposing an ontology, comprising the steps of creating an ontology mapping protocol, building a mapping tool based upon the ontology mapping protocol, mapping the ontology onto the common platform using the mapping tool, and, repurposing the ontology based upon the mapping.

Published U.S. Patent Application No. 20070118394A1 discloses systems and methods showing how direct and honest communication utilizing a distributed computing network, shared content and services, and a focus on social network dynamics and situational context can directly create experiential and realized value for all participants around the globe. Contributors, having instructional content to share pertaining to the functional utilization of generically named goods, essentially become knowledge workers and are rewarded during specific instances when commercial entity Sponsors, who have been granted rights through bidding in an auction, utilize this content to un-intrusively market their branded goods to interested and receptive Consumers, by having their brand names acknowledged as a valuable component of the original content. The content can also be federated with real-time calculations of statistical price information and specialized data services to further increase the experiential value. The Sponsors participating in these niche groups can then be granted access-rights to analyze the developing value network ontology and the ongoing flow of quality information among the participants in the value network.

Published U.S. Patent Application No. 20060004703A1 discloses a single location and application on a network where a user can organize public, group, and private/personal information and have this single, location accessible to the public. A new, ontology-driven portal that organizes all three categories of data according to various "facets" using underlying ontologies to define each "facet" and wherein any type of information can be classified and linked to other types of information is disclosed. An application that enables a user to effectively utilize and manage knowledge and data the user posses and allows other users to effectively and seamlessly benefit from the user's knowledge and data over a computer network is also disclosed. A method of processing content created by a user utilizing a semantic, ontology-driven portal on a computer network is described. The semantic portal application provides the user with a content base, such as a semantic form or meta-form, for creating a semantic posting. The semantic portal utilizes a knowledge data structure, such as a taxonomy or ontology, in preparing a semantic posting based on the information provided by the user via the content base. The semantic portal application prepares a preview of a semantic posting for evaluation by the user. The semantic posting is then either modified by the user or accepted and posted by the user for external parties to view.

Published U.S. Patent Application No. 20040186738A1 discloses systems and methods for idea adoption marketplaces. These systems and methods may employ, for instance, the reach of the Internet, the frictionless commerce of electronic marketplaces, and/or the power of collaborative systems for learning and social decision support to facilitate, for example, the publication, development and/or adoption of useful inventions, whether patentable or not. These systems and methods may support the creation of rich, flexible, accessible, and/or effective marketplace processes for purposes such as creation and protection of intellectual property and/or for its development for the public good.

Published U.S. Patent Application No. 20070087756A1 discloses a method for providing unequal allocation of rights among agents while operating according to fair principles, comprising assigning a hierarchal rank to each agent; providing a synthetic economic value to a first set of agents at the a high level of the hierarchy; allocating portions of the synthetic economic value by the first set of agents to a second set of agents at respectively different hierarchal rank than the first set of agents; and conducting an auction amongst agents using the synthetic economic value as the currency. A method for allocation among agents, comprising assigning a wealth generation function for generating future wealth to each of a plurality of agents, communicating subjective market information between agents, and transferring wealth generated by the secure wealth generation function between agents in consideration of a market transaction. The method may further comprise the step of transferring at least a portion of the wealth generation function between agents.

WIPO Publication No. WO/208/076438 discloses augmenting individual and collective human thinking and knowledge navigation and creation by providing an Internet based software application, relational database and storage infrastructure, which together comprise a Thought Engine; enabling users to input and store concepts and the semantic relationships between concepts, into the Thought Engine; enabling users to input and store links from concepts in the Thought Engine to related informational content elsewhere on the Internet; enabling users to input and store links from concepts that they have input into the Thought Engine to concepts that other users have input into the Thought Engine; enabling users to output, search and navigate all the concepts and the semantic relationships between concepts on the Thought Engine and links to informational content stored elsewhere on the Internet; and enabling users to use the Thought Engine to create, connect, search and explore a network of concepts and links to relevant informational content on the Internet.

WIPO Publication No. WO/2007065470 discloses a system for representation of network management information, comprising a network management system represented through a machine-readable basic network information model comprising a number of network elements with a number of managed objects with instances, and an external network management interface. It comprises first mapping means adapted to generate mapping rules for mapping the machine-readable basic network information model to a formal ontology based network information model, information enrichment means for manually and/or automatically enriching the information of the formal ontology based model semantically, thus providing a semantically enriched formal ontology based network information model, processing means adapted to receive the mapping rules from the first mapping means, network instance data represented by a generic mark-up language from the external network management interface, and the semantically enriched formal ontology based network information model. The processing means are adapted to automatically instantiate the semantically enriched formal ontology based model using said mapping rules and to transform the enriched formal model comprising instances and ontologies to formal logic statements. The system also comprises a formal model storing means for storing the formal logic statements, forming a semantically extended configuration-aware external network management interface.

WIPO Publication No. Wo/2008/001281 discloses a method for creating annotations, comprising: generating one or more semantic folders; generating one or more attributes and one or more values, the one or more attributes and the one or more values correspond to the one or more semantic folders; receiving at least one ontology. The method also includes using the at least one ontology to specify relationships among the one or more attributes and the one or more values to generate a first plurality of attribute-value pairs; linking each of the plurality of attribute-value pairs to a respective one of a plurality of uniform resource identifiers (URIs) to generate a second plurality of attribute-value pairs; and assigning respective ones of the second plurality of attribute-value pairs to respective ones of the one or more semantic folders.

III. SUMMARY OF THE INVENTION

Disclosed are systems and methods for generating standardized models for a resource via social computing. Specifically disclosed is a method for generating a standardized model for a resource via social computing including receiving a request for the registration of a resource from a first client; collecting data defining at least one property of the resource to be registered and registering the resource with a server having a plurality of clients. The method also includes receiving subsequent request for the registration of a substantially similar resource from a second client; providing the subsequent client with earlier collected data from other clients defining the properties of the existing resource, and receiving data chosen by the subsequent client defining the properties of the new substantially similar resource. The method further includes weighting the collected data defining at least one property of the resource based on the frequency of selection of the data to define at least one of the property of the resource by clients of the server registering a substantially similar resource and designating a consensus, of the plurality of clients, of the defining properties of the substantially similar resources as the defining properties for a synthetic standard format model for the resource and substantially similar resources based on the weighted data.

Also disclosed is a method for generating a standardized model for a resource for social computing including receiving a first request for the registration of a resource; collecting data defining at least one property of the resource to be registered; and registering the resource with a server having a plurality of clients, and linking the data defining at least one property of the first resource to the first resource. The method also includes receiving a second request for the registration of a resource; determining if the second request for the registration of a resource is a request to register a resource substantially similar to a resource currently registered and providing a standard metadata form suggesting properties to define a standard model for the resource. The method further includes providing previously collected data linked to the first resource defining at least one property of the first resource to the client registering a second resource substantially similar to the first resource; receiving data selected by the client to define the properties of the substantially similar registered resource, and weighting the received data defining at least one property of the resource based on the frequency of use of the data to define at least one the property of the resource by clients of the server when registering a substantially similar resource. The method also includes merging the data chosen by the plurality of clients defining the properties of the first resource registered and the substantially similar resource registered; determining the consensus, between the clients registering substantially similar resources, of the defining properties of the resource, and linking the defining properties of the resource selected by a consensus of clients registering substantially similar resources with the resource. The method further includes designating the defining properties, linked to a resource, selected by a consensus of clients registering substantially similar resources as the standard synthetic model for the resource, and providing the collected and weighted data, linked to the resource defining the properties of the resource including the standard model for the resource, to subsequent clients registering a substantially similar resource.

Also disclosed is a computer program product comprising a computer usable medium having computer-usable program code for generating a standardized model for a resource for social computing having computer-usable program code for receiving a first request for the registration of a resource; computer-usable program code for collecting data defining at least one property of the resource to be registered, and computer-usable program code for registering the resource with a server having a plurality of clients linking the data defining at least one property of the first resource to the first resource. The computer program product also has computer-usable program code for receiving a second request for the registration of a resource; computer-usable program code for determining if the second request for the registration of a resource is a request to register a resource substantially similar to a resource currently registered, and computer-usable program code for providing collected data linked to the first resource defining at least one property of the first resource to the client registering a second resource substantially similar to the first resource. The computer program product also has computer-usable program code for receiving data selected by the client defining the properties of the substantially similar registered resource; computer-usable program code for merging the data chosen by the plurality of clients defining the properties of the first resource registered and the substantially similar resource registered, and computer-usable program code for determining the consensus, between the clients registering substantially similar resources, of the defining properties of the resource. The disclosed computer program product also features computer-usable program code for linking the defining properties of the resource selected by a consensus of clients registering substantially similar resources with the resource; computer-usable program code for designating the defining properties, linked to a resource, selected by a consensus of clients registering substantially similar resources as the standard model for the resource, and computer-usable program code for providing the collected data linked to the resource defining the properties of the resource including the standard model for the resource to subsequent clients registering a substantially similar resource.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

It will be understood that each block of the flowchart illustrations and block diagrams and combinations of those blocks can be implemented by computer program instructions and/or means.

In at least one embodiment the invention describes a system to transform ad-hoc keywords, tags, and other resource definitions in a social network into a formal representation for a machine readable model with shared syntax and semantics to business transactions within the social community. This shared syntax and semantics allows a machine in the community to search for the resource using a shared syntax and semantics and use it. These shared terms may be in the form of one or more defined properties of the resource or collection of defined properties of the resource that are set fourth as a model for the resource.

Figure 1:
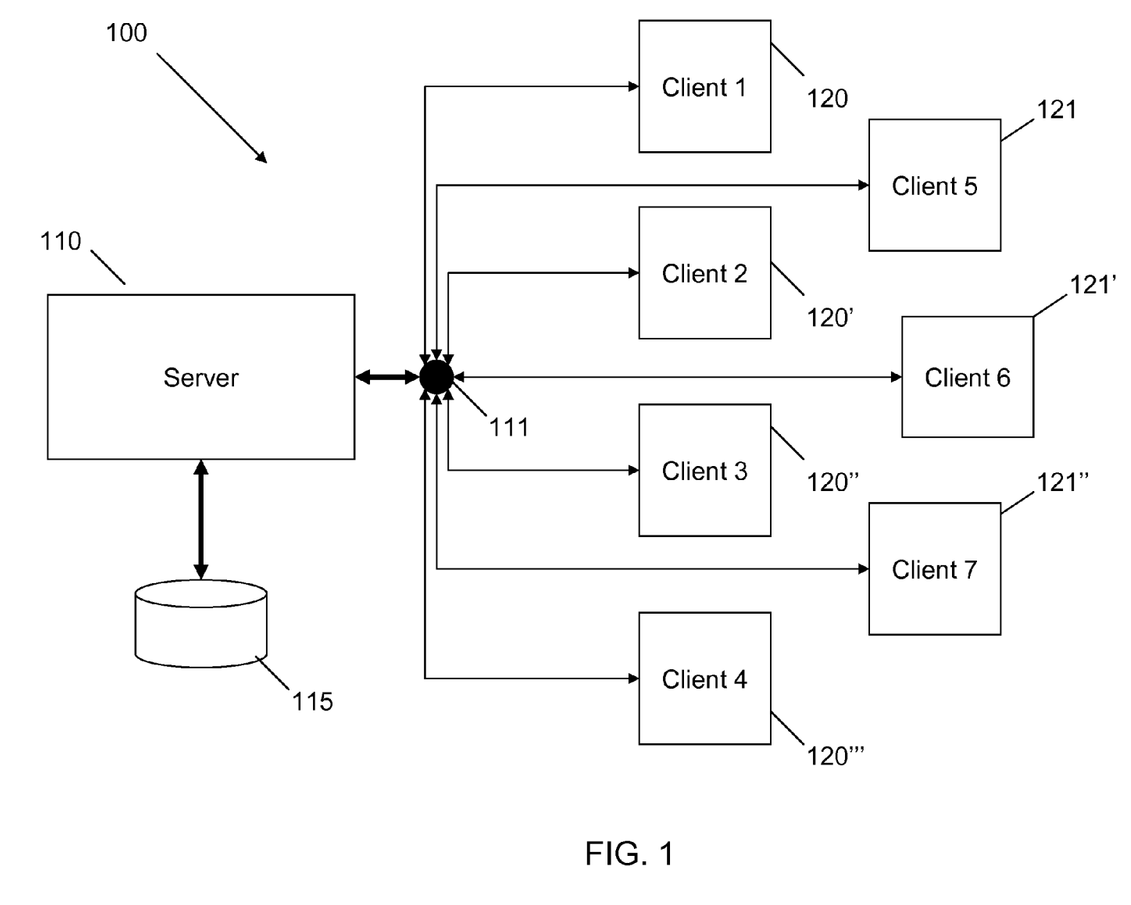
FIG. 1 illustrates a block diagram of an exemplarily system on which the disclosed methods for creating standard data models for given resources via a consensus developed through a social computing network may be implemented.

Referring now to the figures were like reference numbers denote like elements FIG. 1 shows a block diagram of an exemplarily system on which the disclosed methods for creating standard data models for given resources via a consensus developed through a social computing network may be implemented. A resource is considered to be any tangible item that may be described by one or more of its salient properties such as a product or a service.

As shown in FIG. 1 network 100 is embodied in at least one server computer 110 coupled to a plurality of client computers 120, 121 through one or more nodes and routers 111. The server computer is operatively coupled to a data storage means or memory element 115. The data storage means, data storage device or memory element 115 stores data collected by the server computer 110 from the client computers 120, 121 for future recall by the server computer 110. The data storage device 115 may physically be located within the server 110 or it may be disposed remotely in reference to the physical location of server computer 110.

The system 100 is configured to provide the server with the ability to send data to and collect data from each client coupled thereto. The memory element 115 stores data collected by the server from the various clients 120, 121 of the system 100 and stores this data. Data may be retrieved from the memory element 115 by the server 110 and communicated to one or more clients 120, 121 coupled to the server.

Each client is able to consider, accept, or reject all or a portion of the data provided to the client by the server, as reflected in the data provided by the clients 120, 121, collected by the server 110 and ultimately stored in the memory element 115.

Figure 2:
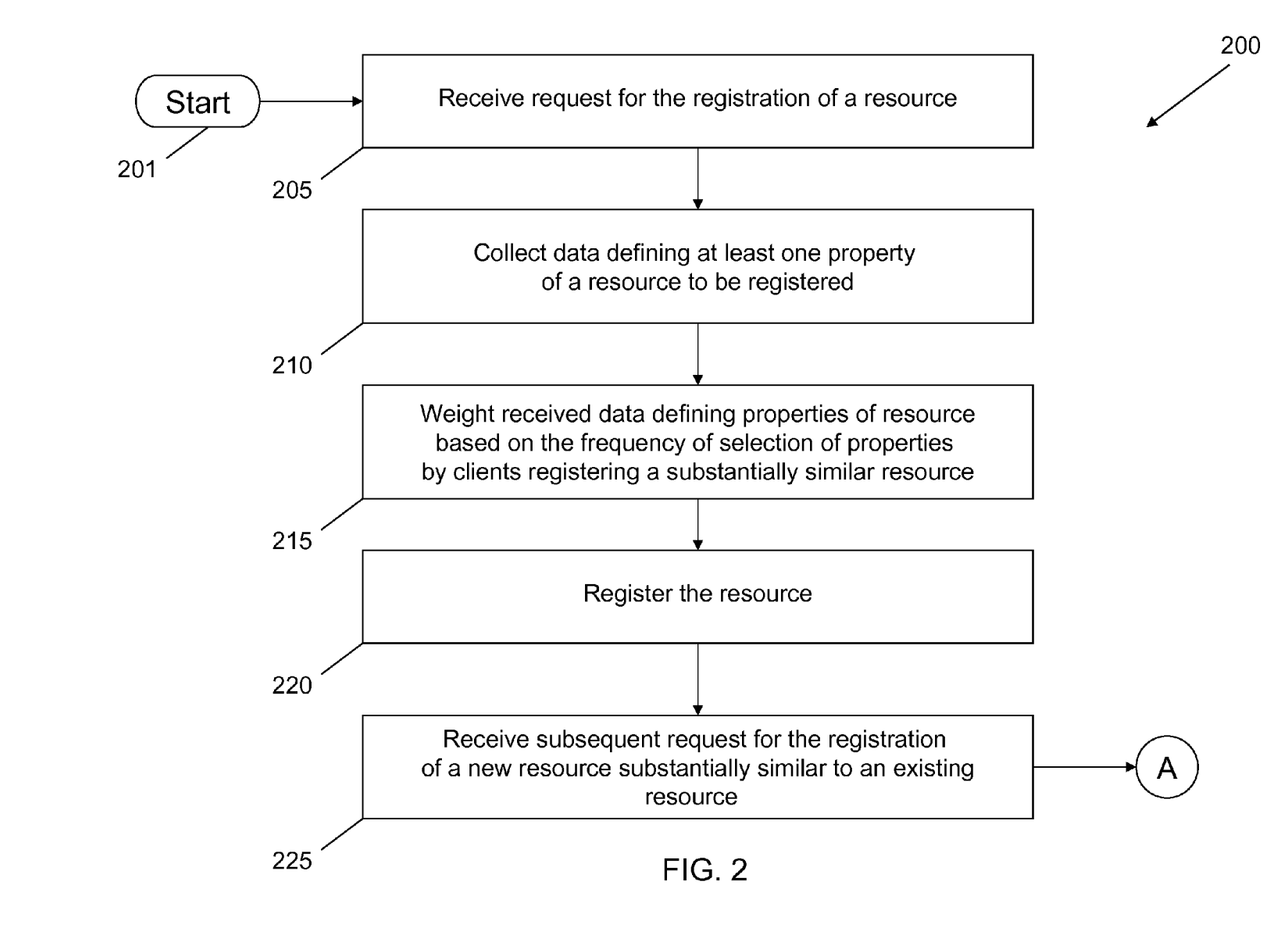
FIGS. 2 and 3 illustrate an exemplarily flowchart for creating a standard data model for a given resource via a consensus developed through a social computing network.
Figure 3:
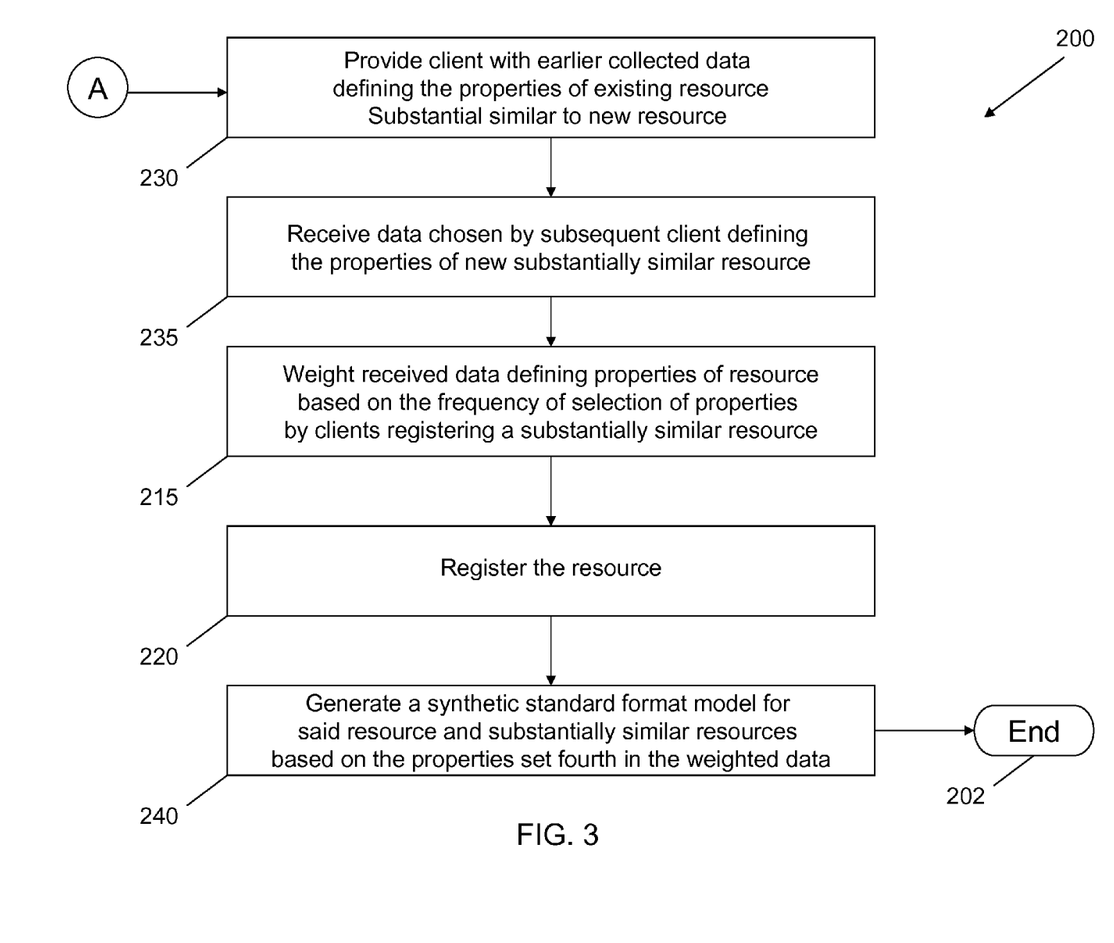

Referring now to FIG. 2 and FIG. 3, with continued reference to FIG. 1, FIG. 2 and FIG. 3 illustrate an exemplarily flowchart 200 for creating a standard data model for a given resource via a consensus developed through a social computing network of the type shown in FIG. 1. The process begins 201 when the server receives a request for the registration of a resource 205 from a first client 120 on a social computing network 100. The system server collects data from that first client 120 defining at least one property of said resource to be registered 210. The system may attempt to extract additional data or suggest salient data useful to the server by presenting a standard format model presented to the client before or after the client makes an initial selection. The system weights the data defining the properties of the resource based on the frequency of the selection of particular properties by other clients registering a substantially similar resource. The data received by the server 110 from the client 120 is stored in the memory element 115. When a resource is initially registered there is only one set of data from which to choose defining the new resource the weighting step is innate to the registration process. When the data defining the salient properties of the resource is collected by the server 210 the system registers the resource 220 with the server 110.

When the server 110 receives a subsequent request for the registration of a substantially similar resource 225 from a second client 121 the server recalls data stored in the memory element 115 relating to the existing resource to which the instant registration request is substantially similar, and provides the second client 121 requesting registration of the substantially similar resource with the earlier collected data from other client 120 defining the properties of the existing resource 230.

When the server 110 receives the data chosen by the subsequent client 121 defining the properties of the new substantially similar resource the data collected defining the properties of the substantially similar resource is weighted 215 based on the frequency of selection of the data to define the properties of the resource by clients of the server registering substantially similar resources.

The data is saved and the substantially similar resource is registered with the service 220. Based on the selected defining properties and the models adopted by a client registering substantially similar resources, the system determines and designates a consensus, of said plurality of clients, of the defining properties of said substantially similar resources as the defining properties and generates a synthetic standard format model for said resource and substantially similar resources based on said weighted data 240. Over time and successive iterations where a plurality of clients register substantially similar resources with the server, an agreed upon standard format and standard model for that particular resource evolves through social consensus of the clients. This standard model allows a community of clients to define a service with particular properties important to that community.

The data provided by the clients of the system, collected by the server and ultimately stored in the memory element 115 may define properties that are domain dependent or properties that are domain independent. The domain dependent properties include user defined properties of the resource being registered. The logic within the service tries to first determine if the resource being registered is substantially similar (the same or the same type) as another previously registered resource. If it is determined that the resource is substantially similar, then the system may merge and converge the properties.

Domain independent properties include essential metadata (like Creator, Publisher Title, Date, etc.) for describing any resource. The Dublin Core Standard or other method for the representation of essential metadata of web documents may also be employed. The Dublin Core Standards include standard properties for (1) Content [like Title, Subject, Description, Type and Source], (2) IP Rights [like Creator, Publisher, Contributor], and (3) Instance properties [like Date, Format, Identifier, Language].

Figure 4:
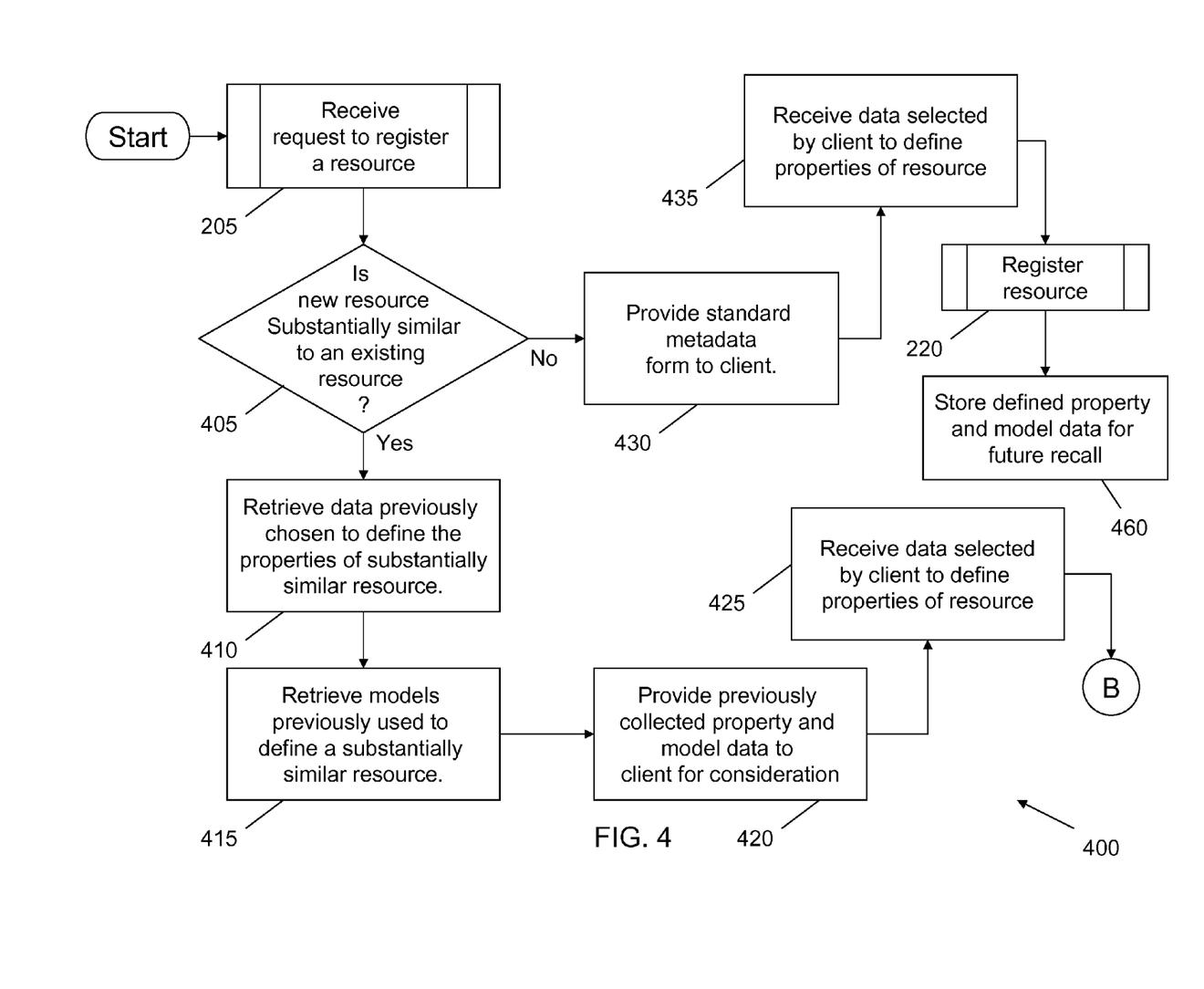
FIGS. 4 and 5 illustrate an exemplarily flowchart showing the flow logic for collecting and evaluating data to create a standard data model for a resource via a consensus developed through a social computing network.
Figure 5:
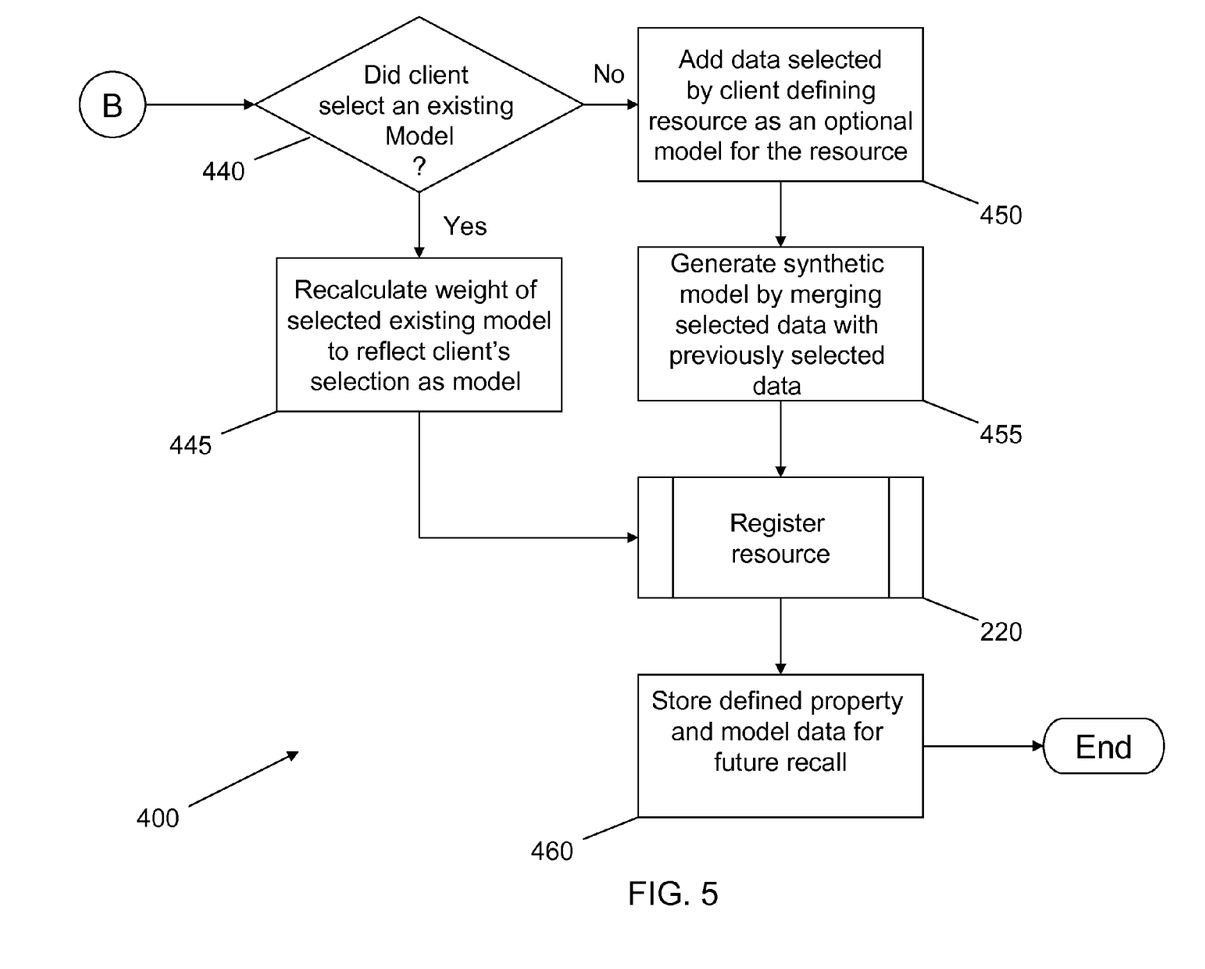

Referring now to FIGS. 4 and 5 with continued reference to FIG. 1, FIGS. 4 and 5 show an exemplarily flowchart 400 showing exemplarily flow logic for collecting and evaluating data to create a standard data model for a resource via a consensus developed through a social computing network. As shown in FIG. 4 in this embodiment, the method begins when the system receives a first request for the registration of a resource. The request is typically received from a client through a client computer 120 coupled to the network 100. The system server 110 evaluates the request and determines if the new resource request is substantially similar to an existing resource previously registered with the system 405.

If the system server 110 determines that the request is for a new resource registration that is not substantially similar to the resources currently registered with the system the server 110 provides the client with a standard metadata form to collect information regarding the new resource request 430. The server receives the data selected by the client to define the properties of the new resource 435 and registers the resource with the system 220 pursuant the client's request. The system server stores the properties used by the client to define the new resource and other model data in the memory element 115 for future recall 460 and ultimate presentation to a client.

If the system server 110 determines that the request is for the registration of a resource substantially similar to an existing resource 405, it retrieves stored data previously chosen to define the properties of a substantially similar resource already registered 410 from the memory element 115, which may include model information relating to a substantially similar previously registered resource 420. The system server provides the previously collected data linked to the existing resource defining at least one property of the existing resource to the client registering a new resource substantially similar to the existing resource.

Referring now to FIG. 5, with continued reference to FIGS. 1 and 4, the system sever receives data selected by the client to define the properties of the substantially similar registered resource 425 and determines if the client selected an existing model 440. The model is a collection of shared terms relating to a resource that is presented to a client. The model may be in the form of one or more defined properties of the resource or collection of defined properties of the resource. The various models and selected properties used to define a resource are weighed by the server. The weights assigned to the received data defining the models, and selected properties of the resource are based on the frequency of use of the data to define at least one the property of the resource by clients of the server when registering substantially similar resources. The weighted property and model data are stored for future recall 460.

If the client did not select from the model information presented, which was used to define a similar resource, eg. the client chose to select other defining properties to define the resource, the system add the data selected by the client defining the resource as an alternative model for substantially similar resources subsequently registered. This model information is stored by the server in the memory element 115. The server also generates a new synthetic model by merging selected data with previously selected data 455. Thus a new synthetic model is created using previous selections and the new data used to define the new substantially similar resource.

The server receives the data selected by the client to define the properties of the new resource and registers the resource, as defined by the client, with the system 220 pursuant the client's request 220. The system server stores the properties used by the client to define the new resource and other model data in the memory element 115 for future recall 460 and ultimate presentation to a client.

In yet another embodiment the system features a method for generating a standardized model for a resource for social computing including a server that receives a first request for the registration of a resource, collects data defining at least one property of said resource to be registered and registers the resource with a server having a plurality of clients, and links the data defining at least one property of said first resource to said first resource. The system server also receives a second request for the registration of a resource, determines if the second request for the registration of a resource is a request to register a resource substantially similar to a resource currently registered and provides a standard metadata form suggesting properties to define a standard model for the resource.

The system provides previously collected data linked to the first resource defining at least one property of the first resource to the client registering a second resource substantially similar to the first resource and receives data selected by the client to define the properties of the substantially similar registered resource. The system server then weights the received data defining at least one property of the resource based on the frequency of use of the data to define at least one the property of the resource by clients of the server when registering a substantially similar resource and merges the data chosen by the plurality of clients defining the properties of the first resource registered and the substantially similar resource registered, and determines the consensus, between the clients registering substantially similar resources, of the defining properties of the resource.

The server links the defining properties of the resource selected by a consensus of clients registering substantially similar resources with the resource, designates the defining properties, linked to a resource, selected by a consensus of clients registering substantially similar resources as the standard synthetic model for the resource, and provides the collected and weighted data, linked to the resource defining the properties of the resource including the standard model for the resource, to subsequent clients registering a substantially similar resource.

In yet another embodiment the system defines a new model for the substantially similar resource wherein the data, chosen by the subsequent client registering a substantially similar resource, does not correspond to the properties defining a substantially similar resource included in an existing model.

In yet another embodiment the previously collected data is linked to a resource defining at least one property of the resource provided to a client registering a resource substantially similar to an existing resource comprises previously defined models selected by a client registering substantially similar resources.

The disclosed invention can take the form of an entirely hardware embodiment, an entirely software embodiment or an embodiment containing both hardware and software elements. In at least one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory, (CD-ROM), compact disk-read/write (CD-R/W) and DVD.

A data processing system suitable for storing and/or executing program code will include at least one processor coupled directly or indirectly to memory elements through a system bus. The memory elements can include a local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In yet another example embodiment the invention takes the form of a computer program product having a computer useable medium including computer usable program code for generating a standardized model for a resource for social computing having computer-usable program code for receiving a first request for the registration of a resource, computer-usable program code for collecting data defining at least one property of the resource to be registered, and computer-usable program code for registering the resource with a server having a plurality of clients linking the data defining at least one property of the first resource to the first resource.

The computer program product also features computer-usable program code for receiving a second request for the registration of a resource; computer-usable program code for determining if the second request for the registration of a resource is a request to register a resource substantially similar to a resource currently registered, and computer-usable program code for providing collected data linked to the first resource defining at least one property of the first resource to the client registering a second resource substantially similar to the first resource. The computer program product also has computer-usable program code for receiving data selected by the client defining the properties of the substantially similar registered resource, computer-usable program code for merging the data chosen by the plurality of clients defining the properties of the first resource registered and the substantially similar resource registered, as well as computer-usable program code for determining the consensus, between the clients registering substantially similar resources, of the defining properties of the resource. The disclosed computer program product also features computer-usable program code for linking the defining properties of the resource selected by a consensus of clients registering substantially similar resources with the resource; computer-usable program code for designating the defining properties, linked to a resource, selected by a consensus of clients registering substantially similar resources as the standard model for the resource, and computer-usable program code for providing the collected data linked to the resource defining the properties of the resource including the standard model for the resource to subsequent clients registering a substantially similar resource.

Although specific example embodiments have been illustrated and described herein, those of ordinary skill in the art appreciate that other variations, aspects, or embodiments may be contemplated, and/or practiced without departing from the scope or the spirit of the appended claims.

The invention claimed is:

1. A method for generating a standardized model for a resource via social computing on a computer network comprising:
   receiving a request for the registration of a resource from a first client;
   collecting data defining at least one property of said resource to be registered;
   registering said resource with a server computer having a plurality of clients coupled thereto;
   receiving a subsequent request for the registration of a new substantially similar resource from a subsequent client;
   providing said subsequent client with earlier collected data from other clients defining the properties of said existing resource;
   receiving data chosen by said subsequent client defining the properties of said new substantially similar resource;
   weighting said collected data defining said at least one property of said resource based on the frequency of selection of said data to define said at least one property of said resource by clients of the server registering a substantially similar resource;
   designating a consensus, of said plurality of clients, of the defining properties of said substantially similar resources as the defining properties for a synthetic standard format model for said resource and substantially similar resources based on said weighted data;
   defining a new model for said substantially similar resource wherein said data, chosen by said subsequent client registering a substantially similar resource, does not correspond to the properties defining a substantially similar resource included in an existing model; and
   generating a revised standard by merging received data, designated by a plurality of clients making subsequent request to register substantially similar resources, with the existing standard synthetic format model.

2. The method of claim 1 wherein said earlier collected data defining the properties of said existing resource provided to subsequent client includes at least one client's previously designated model for a substantially similar resource.

3. The method of claim 1 further comprising:
   merging said data chosen by one of said plurality of clients defining the properties of a new substantially similar resource and the defining properties of said existing resource into a synthetic model and generating an associated weight for each property of said resource.

4. The method of claim 1 wherein said resource and said substantially similar resource have a plurality of common domain dependent properties.

5. The method of claim 4 wherein said domain dependent properties include at least one keyword directly associated with the domain with which the resource defined by said domain dependent properties relates.

6. The method of claim 1 wherein said data defining at least one property of said resource to be registered contains domain independent properties.

7. The method of claim 6 wherein said domain independent properties are properties consistent with the Dublin Core standards.

8. A method for generating a standardized model for a resource for social computing comprising:
  receiving a first request for the registration of a first resource;
  collecting data defining at least one property of said first resource to be registered;
  registering said first resource with a server having a plurality of clients, and linking said data defining at least one property of said first resource to said first resource;
  receiving a second request for the registration of a resource;
  determining if said second request for the registration of a resource is a request to register a resource substantially similar to a resource currently registered;
  providing a standard metadata form suggesting properties to define a standard model for said resource;
  providing previously collected data linked to said first resource defining at least one property of said first resource to a client registering a second resource substantially similar to said first resource;
  receiving data selected by said client defining the properties of said substantially similar registered resource;
  weighting said received data defining at least one property of said resource based on the frequency of use of said data to define at least one said property of said resource by clients of the server when registering a substantially similar resource;
  merging said data chosen by said plurality of clients defining the properties of said first resource registered and said substantially similar resource registered;
  determining the consensus, between said clients registering substantially similar resources, of the defining properties of said resource;
  linking said defining properties of said resource selected by a consensus of clients registering substantially similar resources with said resource;
  designating the defining properties, linked to a resource, selected by the consensus of clients registering substantially similar resources as a standard synthetic format model for said resource;
  providing said collected and weighted data, linked to said resource defining the properties of said resource including the standard synthetic format model for said resource, to subsequent clients registering a substantially similar resource;
  defining a new model for said substantially similar resource wherein said data, chosen by a subsequent client registering a substantially similar resource, does not correspond to the properties defining a substantially similar resource included in an existing model; and
  generating a revised standard by merging received data, designated by a plurality of clients making subsequent request to register substantially similar resources, with the existing standard synthetic format model.

9. The method of claim 8 wherein said previously collected data linked to a resource defining at least one property of said resource provided to a client registering a resource substantially similar to an existing resource comprises previously defined models selected by a client registering substantially similar resources.

10. A computer program product comprising a non-transitory computer usable medium having computer-usable program code for generating a standardized model for a resource for social computing comprising:
  computer-usable program code for receiving a first request for the registration of a first resource;
  computer-usable program code for collecting data defining at least one property of said first resource to be registered;
  computer-usable program code for registering said first resource with a server having a plurality of clients, and for linking said data defining at least one property of said first resource to said first resource;
  computer-usable program code for receiving a second request for the registration of a resource;
  computer-usable program code for determining if said second request for the registration of a resource is a request to register a resource substantially similar to a resource currently registered;
  computer-usable program code for providing a standard meta form suggesting properties to define a standard model for said resource;
  computer-usable program code for providing previously collected data linked to said first resource defining at least one property of said first resource to a client registering a second resource substantially similar to said first resource;
  computer-usable program code for receiving data selected by said client defining the properties of said substantially similar registered resource;
  computer-usable program code for weighting said received data defining at least one property of said resource based on the frequency of use of said data to define at least one said property of said resource by clients of the server when registering a substantially similar resource;
  computer-usable program code for merging said data chosen by said plurality of clients defining the properties of said first resource registered and said substantially similar resource registered;
  computer-usable program code for determining the consensus, between said clients registering substantially similar resources, of the defining properties of said resource;
  computer-usable program code for linking said defining properties of said resource selected by a consensus of clients registering substantially similar resources with said resource;
  computer-usable program code for designating the defining properties, linked to a resource, selected by the consensus of clients registering substantially similar resources as a standard synthetic format model for said resource;
  computer-usable program code for providing said collected and weighted data, linked to said resource defining the properties of said resource including the standard synthetic format model for said resource to subsequent clients registering a substantially similar resources;
  computer-usable program code for defining a new model for said substantially similar resource wherein said data, chosen by a subsequent client registering a substantially similar resource, does not correspond to the properties defining a substantially similar resource included in an existing model; and computer-usable program code for generating a revised standard by merging received data, designated by a plurality of clients making subsequent request to register substantially similar resources, with the existing standard synthetic format model.

11. A method for generating a standardized model for a resource via social computing on a computer network comprising:

receiving a request for the registration of a resource from a first client;

collecting data defining at least one property of said resource to be registered;

registering the resource;

receiving a subsequent request for the registration of a new substantially similar resource from a subsequent client;

providing said subsequent client with earlier collected data from other clients defining the properties of said existing resource;

receiving data chosen by said subsequent client defining the properties of said new substantially similar resource;

weighting said collected data defining at least one property of said resource based on the frequency of selection of said data to define at least one of said property of said resource by clients of the server;

designating a consensus of the defining properties of said substantially similar resources as the defining properties for a synthetic standard format model for said resource and substantially similar resources based on said weighted data;

defining a new model for said substantially similar resource wherein said data, chosen by said subsequent client registering a substantially similar resource, does not correspond to the properties defining a substantially similar resource included in an existing model; and generating a revised standard by merging received data, designated by a plurality of clients making subsequent request to register substantially similar resources, with the existing standard synthetic format model.

12. The method of claim 11 wherein said earlier collected data defining the properties of said existing resource provided to subsequent client includes at least one client's previously designated model for a substantially similar resource.

13. The method of claim 11 further comprising:

merging said data chosen by one of said plurality of clients defining the properties of a new substantially similar resource and the defining properties of said existing resource into a synthetic model and generating an associated weight for each property of said resource.

* * * * *